United States Patent
Gulin et al.

(10) Patent No.: US 9,047,743 B2
(45) Date of Patent: Jun. 2, 2015

(54) SOPHISTICATED AUTOMATED RELATIONSHIP ALERTER

(75) Inventors: Jens A. Gulin, Lund (SE); Per Hyttfors, Raleigh, NC (US); Karl Söderström, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1452 days.

(21) Appl. No.: 12/050,451

(22) Filed: Mar. 18, 2008

(65) Prior Publication Data
US 2009/0239467 A1 Sep. 24, 2009

(51) Int. Cl.
G06Q 99/00 (2006.01)
G08B 5/36 (2006.01)
G06Q 50/00 (2012.01)
G08B 1/08 (2006.01)

(52) U.S. Cl.
CPC *G08B 5/36* (2013.01); *G06Q 50/01* (2013.01); *G08B 2001/085* (2013.01)

(58) Field of Classification Search
CPC ..... G06Q 50/01; G08B 5/36; G08B 2001/085
See application file for complete search history.

(56) References Cited

U.S. PATENT DOCUMENTS

| | | | |
|---|---|---|---|
| 7,634,463 B1* | 12/2009 | Katragadda et al. | 701/431 |
| 7,725,492 B2* | 5/2010 | Sittig et al. | 707/784 |
| 2004/0167813 A1 | 8/2004 | Robertson et al. | |
| 2004/0203363 A1 | 10/2004 | Carlton et al. | |
| 2005/0282530 A1 | 12/2005 | Raff | |
| 2006/0085419 A1* | 4/2006 | Rosen | 707/9 |
| 2006/0234631 A1* | 10/2006 | Dieguez | 455/41.2 |
| 2006/0270419 A1* | 11/2006 | Crowley et al. | 455/456.2 |
| 2008/0133716 A1* | 6/2008 | Rao et al. | 709/220 |
| 2008/0140650 A1* | 6/2008 | Stackpole | 707/5 |
| 2008/0154899 A1* | 6/2008 | Carmony | 707/6 |

OTHER PUBLICATIONS

Dixit, Jay. "Social Networking, Giving serendipity a nudge, Cell phone service helps locate nearby friends and friends of friends." Newsday. Sep. 7, 2004.*
PCT/US2008/075669; PCT International Search Report and Written Opinion mailed Dec. 15, 2008.

* cited by examiner

*Primary Examiner* — Amanda Abrahamson
(74) *Attorney, Agent, or Firm* — Renner, Otto, Boisselle & Sklar, LLP.

(57) ABSTRACT

Device, process and program for determining and alerting a user of the existence of nearby acquaintance, including: providing a first electronic communication device having near-field transmitting and receiving communications capability, a user interface and control circuitry; transmitting from the first communication device an inquiry to determine the presence in the near-field of a compatible second electronic communication device; upon receipt of a positive response to the inquiry, transmitting from the first communication device anonymous user indicia; receiving anonymous user indicia from the second communication device; coordinating the received anonymous user indicia to determine the presence of any matches between the transmitted anonymous user information and the received anonymous user indicia; and providing either a list of matches or an indication of no matches to the user via the user interface. Based on the information exchanged, the users can determine whether a relationship between the users exists or might be created.

20 Claims, 5 Drawing Sheets

| MT's Friends List |||
|---|---|---|
| Contacts First ANON_IDs | Contact's Private Information (Not Shared or Only Limited Sharing) | Known Friends of Contact (Optionally Shared as Second ANON_ID) |
| ANON_ID_1 | Andreas G. (personal information) | ANON_ID_23; ANON_ID_35; ANON_ID_12 |
| ANON_ID_2 | Bruno S. (personal information) | ANON_ID_3; ANON_ID_35; ANON_ID_17 |
| ANON_ID_3 | Carlo B. (personal information) | ANON_ID_23; ANON_ID_5; ANON_ID_27 |
| ... | ... | ... |
| ... | ... | ... |
| ANON_ID_t | Friend T (personal information) | ANON_ID_u-w |
| ANON_ID_x | Friend X (personal information) | ANON_ID_y-z |

Figure 5

| MT's Meeting Log |||
|---|---|---|
| Contacts First ANON_IDs | When Met or Other Relationship | Friends Shared by Contact Second ANON_ID |
| ANON_ID_1 | College 1984, frequent; last: December, 2007 | ANON_ID_33; ANON_ID_35; ANON_ID_12; ANON_ID_74; ANON_ID_23; ANON_ID_45 |
| ANON_ID_2 | Professional Society Mtg. 1998; infrequent last: May, 2005 | ANON_ID_3 |
| ANON_ID_3 | friend of ANON_ID_2 last: May, 2005 | ANON_ID_2; |
| ... | | |
| ... | | |
| ANON_ID_t | | |
| ANON_ID_x | | |

SOPHISTICATED AUTOMATED RELATIONSHIP ALERTER

TECHNICAL FIELD OF THE INVENTION

The present invention relates to a method and mobile communication apparatus for associating relationship information about friends and known and/or potential acquaintances through a local interface adapter in a user friendly manner.

DESCRIPTION OF THE RELATED ART

Electronic equipment, such as, for example, mobile communication devices, mobile telephones, personal digital assistants, etc. are typically equipped to communicate with mobile or cellular telephone communication networks. Such electronic equipment is increasingly being equipped with adapters to support advanced communications in a variety of media other than or in addition to such mobile telephone networks. Such advanced communication media may include, for example, Ethernet, Bluetooth, 802.11, wireless local area networks (WLANs), WiFi, WiMax and the like, in addition to a mobile telephone network. These advanced media are referred to herein as "near field" (or "near-field") communications media. It is noted that in a cellular telephone network, the near-field communication may include communication with another mobile telephone user, in which case the near-field connection is between the mobile telephone and the cell tower through which it connects to the mobile telephone network.

Typically when electronic equipment performs a search to determine available devices having a particular near-field modality (e.g., Bluetooth) in which to connect, all such devices within modality range (i.e., near-field) of the searching electronic equipment are identified to the user. One problem associated with conventional identification is that it is common for the identification to be listed by an anonymous name or other arbitrarily assigned label which does not identify the user of the contacted device and does not provide any information as to possible relationship to the searching electronic equipment or its user. As such, the identification is not very useful outside a closed group of frequent contacts already known to the user. Based upon this rather ambiguous identification, a person using electronic equipment has to accept or not accept a request to connect to the ambiguously identified device based upon this limited information. Another problem associated with conventional identification of discovered devices is that the identification may not be associated with the electronic equipment user's electronic phonebook.

A number of global relationship networking applications, such as Orkut, Friendster, LinkedIn and Facebook, have developed on the Internet. One problem with such sites is that they require a lot of administration, another is that they require access to the Internet, and another is that they represent social networking online instead of in real life, in one's immediate surroundings. Such networking applications are too cumbersome to allow for immediate contact with a new acquaintance, such as a friend of a friend, or a further professional contact known from a first professional contact, or a relative of a friend or relative.

SUMMARY

In view of the aforementioned shortcomings associated with contacting, identifying and connecting to near-field users of mobile electronic equipment who may be a friend, extended friend (e.g., a friend of a friend), or a known and/or potential acquaintance, there is a strong need in the art for a mechanism to make such contacts. There is a strong need to contact and unambiguously identify near-field users of electronic equipment who may be friends, friends of friends, or professional contacts, etc. There is a strong need to associate such identification and contact information with a list of contact information for, e.g., friends and known acquaintances, stored in the user's own electronic device, to facilitate making new contacts and discovering commonalities, such as friends in common, even when the persons making the new contact do not already know one another, e.g., are potential acquaintances. In addition, there is a strong need for the capability to make such new contacts in a way that allows the persons participating to maintain their anonymity and personal information until such time as the decision is made to actually make contact and to share such personal information.

Thus, in one embodiment, the present invention relates to a process for determining and alerting a user of the existence of nearby acquaintance, including: providing a first electronic communication device having near-field transmitting and receiving communications capability, a user interface and control circuitry; transmitting from the first communication device an inquiry to determine the presence in the near-field of a compatible second electronic communication device; upon receipt of a positive response to the inquiry, transmitting from the first communication device anonymous user indicia; receiving anonymous user indicia from the second communication device; coordinating the received anonymous user indicia to determine the presence of any matches between the transmitted anonymous user information and the received anonymous user indicia; and providing either a list of matches or an indication of no matches to the user via the user interface. Based on the information exchanged, the users can determine whether a relationship between the users exists or might be created.

In one embodiment, the present invention relates to an electronic communication device, including:

communications circuitry to provide near-field transmitting and receiving communications;

a user interface; and control circuitry to (a) maintain a friends list including first anonymous user indicia and associated real user information for a plurality of individual persons known to a user of the device and associated second anonymous user indicia, (b) maintain a meetings log of contacts between the user and the individual persons, (c) activate the communications circuitry to transmit to a second electronic communication device in a near-field a portion of the first and/or second anonymous user indicia, (d) activate the communications circuitry to receive from the second electronic communication device third anonymous user indicia, (e) coordinate the third anonymous user indicia with information on the friends list and/or in the meetings log to determine the presence of any matches between the first and/or second anonymous user information and the third anonymous user indicia; and (f) provide to the user interface either a list of matches or an indication of no matches.

In one embodiment, the control circuitry further activates the communications circuitry to determine near-field presence of the second electronic communication device prior to (c).

In one embodiment, the control circuitry further updates the friends list and/or the meetings log.

In one embodiment, the second anonymous user information includes information relating to one or more of the plurality of individual persons on the friends list.

In one embodiment, the meetings log further includes information relating to contacts between pairs of the individual persons on the friends list.

In one embodiment, the device is a mobile telephone and the communications circuitry further comprises voice communications capability.

In one embodiment, the present invention relates to a process for determining and alerting a user of the existence of known and/or prospective acquaintances in a near-field, including:

providing a first electronic communication device having circuitry to transmit and receive communications in a near-field, a user interface, and control circuitry to (a) maintain a friends list including first anonymous user indicia and associated real user information for a plurality of individual persons known to the user and associated second anonymous user indicia, and (b) maintain a meetings log of contacts between the user and the individual persons;

transmitting from the first communication device an inquiry to determine the presence in the near-field of a compatible second electronic communication device;

upon receipt of a positive response to the inquiry, transmitting from the first communication device the anonymous user indicia for a portion of the friends list;

receiving third anonymous user indicia from the second communication device;

coordinating the third anonymous user indicia with information on the friends list to determine the presence of any matches between the first and/or second anonymous user information and the third anonymous user indicia; and providing either a list of matches or an indication of no matches to the user via the user interface.

In one embodiment, the process further includes reviewing the list of matches and determining whether to further communicate with the second communications device.

In one embodiment, the process further includes communicating with the second communications device to exchange more detailed information relating to at least a portion of the first, second and/or third anonymous user indicia.

In one embodiment, the process further includes reviewing the list of matches and determining whether to add any item from the third anonymous user indicia to the friends list and/or to update the meetings log with information based on the third anonymous user indicia.

In one embodiment, the process further includes communicating with the second communications device to exchange more detailed information relating to at least a portion of the first, second and/or third anonymous user indicia, and adding the more detailed information to the friends list and/or updating the meetings log.

In one embodiment, the second anonymous user information includes information relating to one or more of the plurality of individual persons on the friends list.

In one embodiment, the meetings log further includes information relating to contacts between pairs of the individual persons on the friends list.

In one embodiment, the present invention relates to a process for establishing communication between first and second electronic communication devices and determining whether a relationship exists between users of the first and second devices, the first and second devices each including compatible near-field communications capability, a memory, a processor, a user interface and being programmed to maintain information relating first and second anonymous user information with secure detailed user information for a plurality of known individual persons, including:

the first device transmitting to the second device a discovery request, including transmitting to the second device first anonymous user information of the first device;

the second device receiving the discovery request and responding with third anonymous user information from the second device;

the first device receiving the third anonymous user information of the second device;

the first device determining whether the third anonymous user information corresponds to information stored by the first device;

the first device displaying on the user interface information relating to the third anonymous user information including any matches between the first anonymous user information and the third anonymous user information; and the first electronic device responding to the second electronic device to establish communication between the users.

In one embodiment, the first device includes control circuitry to (a) maintain a friends list including the first anonymous user indicia and associated real user information for a plurality of known individual persons, wherein the associated real user information further includes anonymous user indicia for additional individual persons known to any of the plurality of known individual persons on the friends list, and (b) to maintain a meetings log of contacts between the user and the known individual persons and contacts between pairs of the additional individual persons on the friends list.

In one embodiment, the process further includes reviewing the list of matches and determining whether to further communicate with the second communications device.

In one embodiment, the process further includes communicating with the second communications device to exchange more detailed information relating to at least a portion of the first, second and/or third anonymous user indicia. In one embodiment, the more detailed information includes a portion of the real user information associated with one of the anonymous user indicia.

In one embodiment, the process further includes reviewing the list of matches and determining whether to add any item from the third anonymous user indicia to the friends list.

In one embodiment, the process further includes communicating with the second communications device to exchange more detailed information relating to at least a portion of the first, second and/or third anonymous user indicia, and adding the more detailed information to the friends list. In one embodiment, the more detailed information includes a portion of the real user information associated with one of the anonymous user indicia.

In one embodiment, the process further includes reviewing the list of matches and determining whether to update the meetings log with information based on the third anonymous user indicia. In one embodiment, the process further includes updating the friends list and/or the meetings log based on new information received during the process.

In one embodiment, the process further includes communicating with the second communications device to exchange more detailed information relating to at least a portion of the first, second and/or third anonymous user indicia, and adding the more detailed information to the meetings log. In one embodiment, the more detailed information includes a portion of the real user information associated with one of the anonymous user indicia.

In one embodiment, the present invention relates to a program stored on a machine readable medium, the program for controlling operation of an electronic device and including executable logic to:

control operation of communications circuitry providing near-field transmitting and receiving communications, a user interface, and control circuitry;

control operation of the control circuitry to (a) maintain a friends list including first anonymous user indicia and associated real user information for a plurality of known individual persons and associated second anonymous user indicia, (b) maintain a meetings log of contacts between the user and the known individual persons;

activate the communications circuitry to transmit to a second electronic communication device in a near-field a portion the first and/or second anonymous user indicia;

activate the communications circuitry to receive from the second electronic communication device third anonymous user indicia;

control operation of the control circuitry to coordinate the third anonymous user indicia with information on the friends list and/or in the meetings log to determine the presence of any matches between the first and/or second anonymous user information and the third anonymous user indicia; and to provide to the user interface either a list of matches or an indication of no matches.

In one embodiment, the program further includes executable logic to activate the communications circuitry to determine near-field presence of the second electronic communication device prior to activating the communications circuitry to transmit the anonymous user indicia. This determination may be made automatically or by manual activation of the communications circuitry.

In one embodiment, the program further includes executable logic to update the friends list and/or the meetings log.

In one embodiment, the program further includes executable logic to control operation of the control circuitry to coordinate information relating to one or more of the plurality of known individual persons on the friends list and/or in the meetings log.

In one embodiment, the program further includes executable logic to control operation of the control circuitry to coordinate information relating to contacts between pairs of the individual persons on the friends list and/or in the meetings log.

In one embodiment, the program further includes executable logic to control operation of the communication circuitry to exchange with the second communications device more detailed information relating to at least a portion of the first, second and/or third anonymous user indicia.

In one embodiment, the program further includes executable logic to control operation of the control circuitry to add the more detailed information to the friends list and/or to the meetings log.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof.

The term "electronic equipment" includes portable radio communication equipment. The term "portable radio communication equipment", which herein after is referred to as a mobile radio terminal, includes all equipment such as mobile telephones, pagers, communicators, i.e., electronic organizers, personal digital assistants (PDAs), portable communication apparatus, smart phones or the like.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION

All ranges and ratio limits disclosed in the specification and claims may be combined in any manner. It is to be understood that unless specifically stated otherwise, references to "a", "an", and/or "the" may include one or more than one, and that reference to an item in the singular may also include the item in the plural. All combinations specified in the specification and claims may be combined in any manner.

In one embodiment, the present invention is directed to electronic equipment, sometimes referred to herein as a communication device, mobile telephone, portable telephone and electronic device having an improved method for association and/or discovery through a local interface adapter (e.g. a wired and/or wireless local interface adapter) with other electronic equipment. In describing the present invention, reference is made to a mobile telephone for convenience; this is merely exemplary and is not limiting to the scope of the invention.

In one aspect of the invention, a mobile telephone initiates a search for electronic equipment having a predetermined modality and within communication range of the mobile telephone. This may include a cellular telephone carrier's system. Electronic equipment capable of responding to the request (e.g., another near-field user's electronic equipment such as a second mobile telephone) transmit information through a local interface adapter. Such information may include, for example, an inquiry including information such as a unique identifier and, optionally, additional unique identifiers of friends known to the inquiring user. The unique identifier may be any unique characteristic, item or feature that may be assigned to a contact, and the unique identifier is anonymous in that while it is unique to any individual person, it does not actually identify that person, except to others who know the individual person and have that person's anonymous unique identifier associated with the person's actual identity. Herein, the unique identifier is referred to as the person's anonymous identity, or ANON_ID. The ANON_ID could, for example, be a unique identifier such as a telephone number, a session initiation protocol (SIP) address, or an encrypted name of the person, or a 128-bit unique identification number encrypting, e.g., a name. In any case, the ANON_ID is unique to the individual person, so that each individual using the system of the present invention is uniquely identified by the ANON_ID. Each individual user of the system of the present invention has stored in the user's electronic equipment a list of ANON_IDs and an associated list of additional, variously detailed information about the actual person associated with a given ANON_ID. Such detailed information or portions of it is not shared until such time as the user and the new contact have confirmed each other's actual identification and made a decision to meet and/or to share detailed information with each other. The detailed information may include, for example, personal and/or business and/or professional information, biometric information such as fingerprints, retinal scans, iris scans, hand measurements, voice recognition, photographs of the face, anatomical traits, etc. In addition, the detailed information may include other specific information known to the user, such as a record of previous meetings, a list of the contact's known friends and acquaintances (also stored and associated with their own ANON_ID) and other details, which may include, e.g., personal, business and/or professional information, social security number, E-mail address, IP address, audio recordings, video recordings, passwords, and the like. Some or all of the detailed information may or may not be shared, at the discretion of the individual user, in any given situation. The present invention provides to the user control of the level or degree of identification provided to any new or old contact. The level of identification may range, for example, from nothing more than anonymous information such as the ANON_ID of the user only, to a list of ANON_IDs of the user and of selected friends and acquaintances, to a list of ANON_IDs and full or partial history of previous meetings with the persons associated with the ANON_ID, to any level of identification, including the above-mentioned personal information.

By receiving the unique identifier associated with the newly contacted electronic equipment, the user of the mobile telephone may search an associated database, such as an electronic phonebook application, having stored unique identifying information associated with each user's ANON_ID to identify contact information associated with the ANON_ID and to the real person. For example, if a received unique identifier is stored in the electronic phonebook of the mobile telephone, the mobile telephone may display a user-friendly designation corresponding to contact information previously stored in the electronic phonebook to the associated user of the mobile telephone.

In one embodiment, the communication described herein is directly between users of mobile telephones configured to carry out the functions and operations described herein. Thus, in this embodiment, there is no central server or network connection involved in the communication, and the communication is directly peer-to-peer.

In one embodiment, there is a central server or network through which connections and communications are made. In this embodiment, the user would make a connection, for example, through a mobile telephone network, or in another embodiment, through a Wi-Fi network in an institution such as a university. In this embodiment, the central server may be used to create and store unique ANON_IDs, so that every user has his or her own unique ANON_ID across the network. This embodiment would thus facilitate making a given user's ANON_ID more widely known and to allow for association of specific information or individual status that may be of further interest to other users. For example, a dating service could provide the central server on which members can store their ANON_ID and any selected information, and through which members may discover and contact each other directly when in near-field range of one another. In this embodiment, members could be alerted to the presence in the near-field of other members sharing common interests or meeting previously determined specific criteria. In this way pairs of members who did not previously know each other could more easily make contact, even though they did not share any other friends and are not listed on each other's friends list or meeting log.

In another embodiment, any or all of the information may be stored on a central server and the communication described herein between users of mobile telephones configured to carry out the functions and operations described herein takes place over a network, such as a mobile telephone network.

Figure 1:
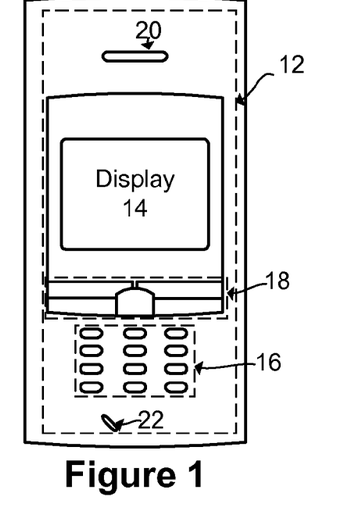
FIG. 1 is a schematic diagram illustrating electronic equipment in accordance with aspects of the present invention.

Referring to FIG. 1, electronic equipment 10 is shown in accordance with an exemplary embodiment of the present invention. The electronic equipment 10 in the exemplary embodiment is a mobile telephone and will be referred to as the mobile telephone 10. As noted above, the electronic equipment may be any known electronic equipment, but is exemplified herein as a mobile telephone. The mobile telephone 10 is shown as having a "brick" or "block" design type housing, but it will be appreciated that other type housings, such as clamshell housing or a slide-type housing, may be utilized without departing from the scope of the invention.

As illustrated in FIG. 1, the electronic equipment 10 may include a user interface 12 (identified by dotted lines) that enables the user easily and efficiently to perform one or more communication tasks (e.g., identify a contact, select a contact, make a telephone call, receive a telephone call, establish and manage local wireless and/or wired exchanges of information, etc.). The user interface 12 of the mobile telephone 10 generally includes one or more of the following components: a display 14, an alphanumeric keypad 16, function keys 18, a navigation tool 19, a speaker 20, and/or a microphone 22. The user interface 12 of the mobile telephone 10 includes components configured to carry out the processes and to activate the programs of the present invention.

The display 14 presents information in a viewable format to a user. Such information may include operating state, time, telephone numbers, contact information, unique identifiers, various navigational menus, status of one or more functions, photographs, multimedia, etc., which enable the user to utilize the various features of the mobile telephone 10. The display 14 may also be used to visually present content accessible by the mobile telephone 10, as well as display contact information from an electronic phonebook in accordance with aspects of the present invention. The displayed content may include E-mail messages, audio and/or video presentations stored locally in memory 24 (FIG. 2) of the mobile telephone 10 and/or stored remotely and download to the mobile telephone 10 (e.g., from a remote storage device, a mail server, remote personal computer, etc.). Such presentations may be derived, for example, from multimedia files stored on a remote web server, received through E-mail messages, etc. The multimedia files may include any type of multimedia content (e.g., video, audio, graphics, songs, movies, television broadcasts, radio broadcasts, satellite radio broadcasts, etc.). The audio component of such presentations, including an end-user code, may be broadcast to the user with speaker 60 of the mobile telephone 10. Alternatively, the audio component may be broadcast to the user though a headset speaker (not shown). In one embodiment, operation of the mobile telephone 10 may be fully or partially controlled by inputs directly to the display 14.

The mobile telephone 10 further includes a keypad 16 that provides for a variety of user input operations. For example, the keypad 16 may include alphanumeric keys for allowing entry of alphanumeric information such as user-friendly identification of contacts, E-mail addresses, distribution lists, telephone numbers, phone lists, contact information, notes, etc. In addition, the keypad 16 typically may include special function keys such as a "call send" key for transmitting an E-mail, initiating or answering a call, and a "call end" key for ending, or "hanging up" a call. Special function keys may also include menu navigation keys, for example, for navigating through a menu displayed on the display 14 to select different telephone functions, profiles, settings, etc., as is conventional. Other keys associated with the mobile telephone 10 may include a volume key, audio mute key, an on/off power key, a web browser launch key, a local adapter association key (e.g., for wired and/or wireless communications), an E-mail application launch key, a camera key, etc. Keys or key-like functionality may also be embodied as a touch screen associated with the display 14.

The mobile telephone 10 may also include conventional call circuitry that enables the mobile telephone 10 to establish a call, transmit and/or receive E-mail messages, and/or exchange signals with a called/calling device, typically another mobile telephone or landline telephone. However, the called/calling device need not be another telephone, but may be some other electronic device such as an electronic device compliant with one or more communication protocols, Internet web server, E-mail server, content providing server, etc.

Figure 2:
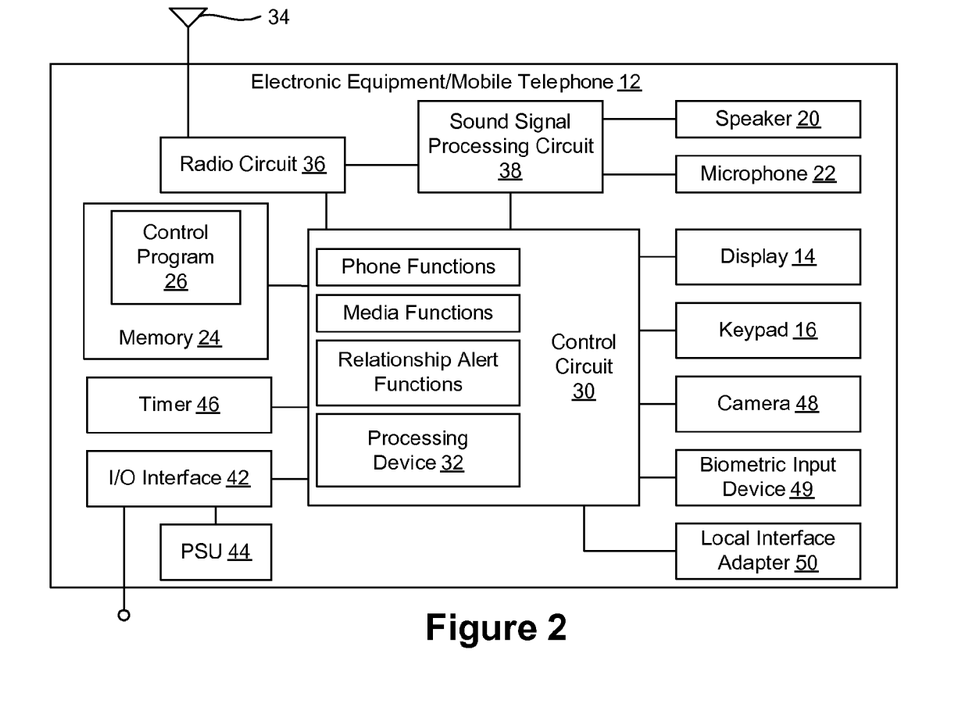
FIG. 2 is a block schematic diagram illustrating electronic equipment in accordance with aspects of the present invention.

Referring to FIG. 2, a functional block diagram of the mobile telephone 10 is illustrated. The mobile telephone 10 includes a primary control circuit 30 that is configured to carry out overall control of the functions and operations of the mobile telephone 10. The control circuit 30 may include a processing device 32, such as a CPU, microcontroller or microprocessor. The processing device 32 executes code stored in memory (not shown) within the control circuit 30 and/or in a separate memory, such as memory 24, in order to carry out operation of the mobile telephone 10 and perform all of the functionality disclosed herein. As illustrated in FIG. 2, the control circuit may include functionality to control the main device functions, such as those of the mobile telephone 10, to control additional device functions such as media functions, and the relationship alerter functions in accordance with embodiments of the present invention. It will be apparent to a person having ordinary skill in the art of computer programming, and specifically in application programming for mobile telephones or other electronic devices, how to program an electronic device such as the mobile telephone 10 to operate and carry out logical functions associated with the programming described herein. Accordingly, details as to specific programming code have been left out for the sake of brevity. Also, while the communications and process of the present invention is executed by the processing device 32 in accordance with the described embodiment, such functionality could also be carried out via dedicated hardware or firmware, or some combination of hardware, firmware and/or software.

The memory 24 may be any suitable memory device. For example, the memory 24 may be, for example, random access memory, read only memory, a buffer, a flash memory, a hard drive, a removable media, a volatile memory and/or a non-volatile memory or a combination of any of the foregoing. In order to carry out the various functions described herein, the memory 24 may include one or more computer applications (or sub-applications), including a control program 26 programmed to achieve the functionality described herein.

Continuing to refer to FIGS. 1 and 2, the mobile telephone 10 includes an antenna 34 coupled to a radio circuit 36. The radio circuit 36 includes a radio frequency transmitter and receiver for transmitting and receiving signals via the antenna 34 as is conventional. The mobile telephone 10 generally utilizes the radio circuit 36 and antenna 34 for voice, Internet and/or E-mail communications over a cellular telephone network. The mobile telephone 10 further includes a sound signal processing circuit 38 for processing the audio signal transmitted by/received from the radio circuit 36. Coupled to the sound processing circuit 38 are the speaker 20 and a microphone 22 that enable a user to listen and speak via the mobile telephone 10 as is conventional. The radio circuit 36 and sound processing circuit 38 are each coupled to the control circuit 30 so as to carry out overall operation.

The mobile telephone 10 also includes the aforementioned display 14 and keypad 16 coupled to the control circuit 30. The mobile telephone 10 further includes an I/O interface 42. The I/O interface 42 may be in the form of typical mobile telephone I/O interfaces, such as a multi-element connector at the base of the mobile telephone 10. As is typical, the I/O interface 42 may be used to couple the mobile telephone 10 to a battery charger to charge a power supply unit (PSU) 44 within the mobile telephone 10. In addition, or in the alternative, the I/O interface 42 may serve to connect the mobile telephone 10 to a wired personal hands-free adapter, to a personal computer or other device via a data cable, etc. The mobile telephone 10 may also include a timer 46 for carrying out timing functions. Such functions may include timing the duration of calls, generating the content of time and date stamps, etc.

The mobile telephone 10 may also include various built-in accessories, such as a camera 48 for taking digital pictures. Image files corresponding to the pictures may be stored in the memory 24. In one embodiment, the mobile telephone 10 also may include a position data receiver (not shown), such as a global positioning satellite (GPS) receiver, Galileo satellite system receiver or the like. In another embodiment, the mobile telephone 10 may include a biometric input device 49 for entering biometric information that may be used for scanning and/or otherwise obtaining biometric information associated with the user of the mobile telephone 10 and/or contacts maintained in the memory 24.

To establish communication with other near-field devices, such as a wireless headset, another mobile telephone, a computer, other electronic equipment, etc., the mobile telephone 10 may include a local interface adapter 50. The local interface adapter 50 may be any adapter operable to facilitate communication between the mobile telephone 10 and at least one electronic device. For example, the local interface adapter 50 may be wired and/or wireless and may support communications utilizing any communication protocol (e.g., Ethernet, Bluetooth, 802.11, WLAN, WiFi, WiMax, Infrared, etc.).

The mobile telephone 10 may be configured additionally to operate in a wide area communications system (e.g. 2G, 3G, GPRS, etc.) (not illustrated). The system may include one or more servers for managing calls, Internet access and/or E-mails placed by and/or destined to the mobile telephone 10, transmitting content (e.g., image files, audio files, video files, etc.) to and/or from the mobile telephone 10 and carrying out any other support functions. The server generally communicates with the mobile telephone 10 via a network and a transmission medium. The transmission medium may be any appropriate device or assembly, including, for example, a communications tower, another mobile telephone, a wireless access point, a satellite, the Internet, etc. Portions of the network may include wireless and/or wired transmission pathways.

Figure 3:
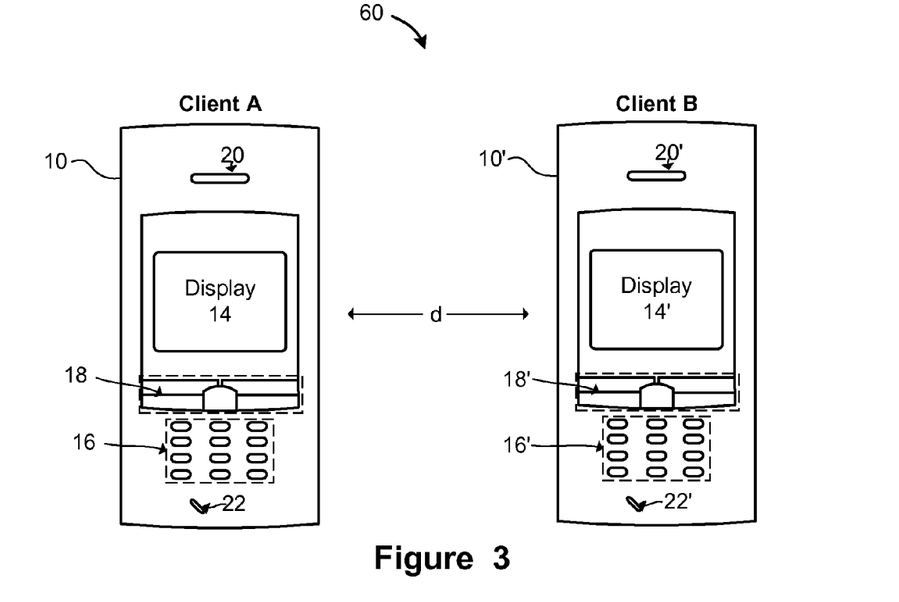
FIG. 3 is an illustration of an exemplary local communication system between separate electronic equipment at a near-field distance "d" in accordance with aspects of the present invention.

FIG. 3 illustrates an exemplary communication system 60 in accordance with the present invention. The system 60 includes a first mobile telephone 10 and a second mobile telephone 10' at a near-field distance "d". Although both devices are shown as mobile telephones, the electronic devices each may be any electronic device capable of supporting communication with communications through interface adapter 50 of the electronic device. For example, the electronic device may be electronic equipment, a mobile telephone, a personal digital assistant (PDA), a personal computer (PC), a pager, etc. As stated above, the first mobile telephone 10 and the second mobile telephone 10' are adapted to communicate with each other through wireless and/or wired local interface adapters. For example, the first mobile telephone 10 and the second mobile telephone 10' are capable of communicating with each other using Bluetooth or any other desirable wired and/or wireless local communication protocols. The following discussion will focus on communications between the first mobile telephone 10 and the second mobile telephone 10' using Bluetooth compatible protocols. However, one of ordinary skill in the art will readily appreciate that other communication protocols and/or specifications may also be implemented in accordance with the present invention (e.g., 802.11 compliant standards (e.g. 802.11(a), 802.11(b), 802.11(g), etc.), WiFi, WiMax, infrared, Ultra Wideband, near-field communications, radio frequency identification, Ethernet, etc.).

Referring to FIG. 3, the first mobile telephone 10, associated with Client A, and the second mobile telephone 10', associated with Client B, illustrate communication devices that include a mobile ad hoc communication network. Client A and Client B may be, for example, patrons in a coffee shop, participants in a professional meeting, or people in some other environment, such as a sporting event or a nightclub. In one embodiment, the mobile ad hoc communications network is a Bluetooth piconet that includes one master device and up to seven active slave devices. In operation, the local interface adapter 50, which may be Bluetooth compatible, is activated to conduct an inquiry process to discover all Bluetooth enabled devices in its coverage area (also referred to herein as the communication range). In another embodiment, the inquiry process is limited to only those devices previously stored in the control program 26 of the mobile telephone 10. In another embodiment, the inquiry process is limited to a subset of devices previously specified in the control program 26. In another embodiment, the inquiry process is limited to a subset of persons listed in the control program 26. For examples, the inquiry process may be limited to professional contacts only, or to personal contacts only, or to family contacts only. In one embodiment, the inquiry may be limited to a single person.

For this particular example, the first mobile telephone 10 and the second mobile telephone 10' are within an operative distance "d" from each other, as illustrated in FIG. 3. The distance "d" is within near-field communication range of the first mobile telephone 10 and the second mobile telephone 10'. One of ordinary skill in the art will readily appreciate that the operative near-field distance "d" will vary depending on, among other things, the modality used for communication. For example, the operative range for Bluetooth communication may be less than about 10 meters. In one embodiment, the near-field distance in which the present invention operates is in the range from less than 10 meters to about 500 meters, and in another embodiment, is in the range from less than 10 meters to about 100 meters. Longer distances may also be within the scope of the invention, for example, distances within mobile telephone communications capabilities.

Referring to FIG. 3, the first mobile telephone 10 enters into a discovery substate to discover other Bluetooth devices within the operative range. Typically, this occurs by the mobile telephone 10 entering the inquiry substate to discover other Bluetooth devices. The Bluetooth specification defines inquiry access codes that allow a device to specify the type of device it is seeking, such as PDA's, mobile telephones, printers, LAN access points, etc. During the inquiry process, the first mobile telephone 10 generates an inquiry hopping sequence. This inquiry hopping sequence is derived from the first mobile telephone 10 clock and the chosen inquiry access code. Once the first mobile telephone 10 generates an inquiry hopping sequence, it broadcasts inquiry messages as it sequentially switches to each channel defined in the hopping sequence.

In one embodiment, discoverable devices periodically enter the inquiry scan substate. In this substate, devices hop according to the inquiry scan hopping sequence, which is also based on the inquiry access code and the local clock. If the device performing the inquiry scan (e.g., the second mobile telephone 10') receives an inquiry message, it enters the inquiry response substate and replies with an inquiry response message. The inquiry response includes the remote device's address and clock, a unique identifier (e.g., telephone number, SIP address, etc.).

In one embodiment, only discoverable devices within the operative broadcast range "d" that recognize the one or more ANON_ID transmitted by the mobile telephone 10 will respond to the device inquiry.

During the discovery process related to the present invention, the first mobile telephone 10 and the second mobile telephone 10' are capable transmitting a unique identifier, such as the ANON_ID disclosed above. As noted, this unique identifier is referred to as "ANON_ID", and a plurality of ANON_IDs may be referred to, e.g., by sequential numbers appended, such as "ANON_ID_34".

Figure 4:
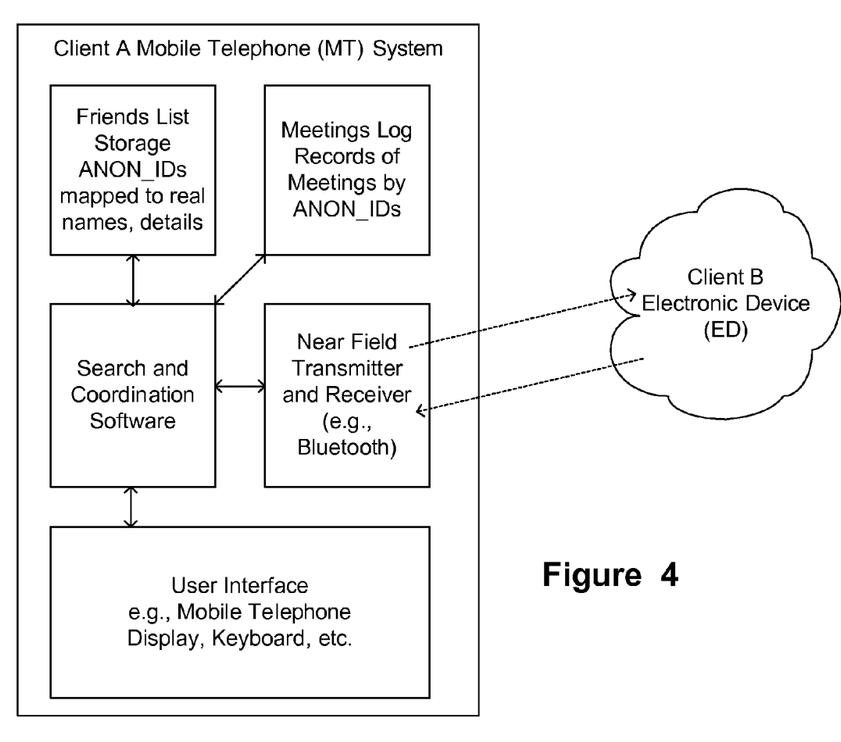
FIG. 4 is a schematic illustration of elements of an exemplary device in accordance with an embodiment of the present invention.

Referring now to FIG. 4, there is shown a schematic illustration of elements of an exemplary system, such as software programmed and hardware included in a mobile telephone, in accordance with an embodiment of the present invention. The mobile telephone illustrated in FIG. 4 is associated with Client A and, as shown, may communicate with Client B via an electronic device (ED) which may be, for example, the second mobile telephone 10'.

As shown in FIG. 4, the system includes a friends list, which stores the ANON_IDs and the real names and details of the friends, in which each ANON_ID is mapped to the associated real name and other personal information known to the user of the mobile telephone 10. As shown in FIG. 4, the system further includes a meetings log, containing records of meetings between the user of the mobile telephone 10 and the friends listed in the friends list. The meetings log may be arranged, for example, simply by associating each ANON_ID with a record of the meetings between the user and the owner of each ANON_ID listed. The meetings log may be used as a reference to earlier meetings with a given friend, and as a reminder of significant details regarding the meeting and/or friend. As shown in FIG. 4, the system further includes Search and Coordination Software which, as its name implies, controls the search and transmission functions of the mobile telephone, coordinates the contents of the friends list and the meetings log, and provides input and control of information provided to the User Interface, which may include items such as a mobile telephone display, a keyboard, a laptop computer screen, a desktop computer monitor, etc. Finally, as shown in FIG. 4, the system further includes a Near-Field Transmitter and Receiver, which operates, for example, Bluetooth communication capability. As shown in FIG. 4, the Near-Field Transmitter and Receiver provides communications to, e.g., the electronic device of Client B, such as the second mobile phone 10'.

Figure 5:
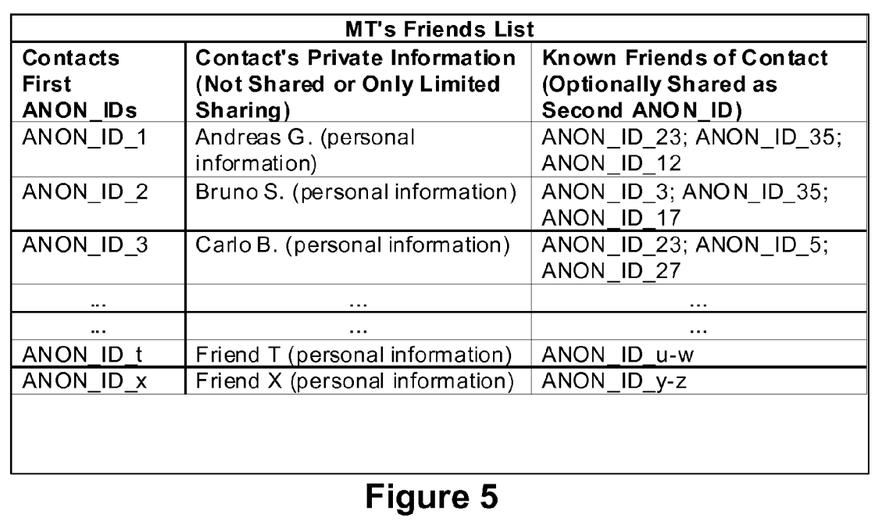
FIG. 5 is an example of the contents of a friends list for an exemplary mobile telephone in accordance with an embodiment of the present invention.

Referring next to FIG. 5, there is shown an example of the contents of a friends list for an exemplary mobile telephone system, such as that shown in FIG. 4, in accordance with an embodiment of the present invention. As illustrated in FIG. 5, the friends list includes a list of contact's ANON_IDs, associated private information regarding the real person associated with each of the ANON_IDs, and a list of friends shared by each of the contacts on the ANON_ID list. As indicated in FIG. 5, in one embodiment, portions of the friends list, each friend identified only by its own respective ANON_ID, may be shared when communicating in accordance with the invention. As indicated in FIG. 5, in one embodiment, the private information associated with each contact is not shared. In another embodiment, the private information, or portions thereof, may be shared with another used in communication in accordance with the invention, depending on individual circumstances. This feature of the invention provides for the user to select the degree of confidentiality as appropriate for any given circumstance. Thus, for example, if operation of the process in accordance with the invention discovers a close friend who has not been contacted in some time, the exchange of information may be more extensive than for a new contact, made with a previously unknown person.

Figure 6:
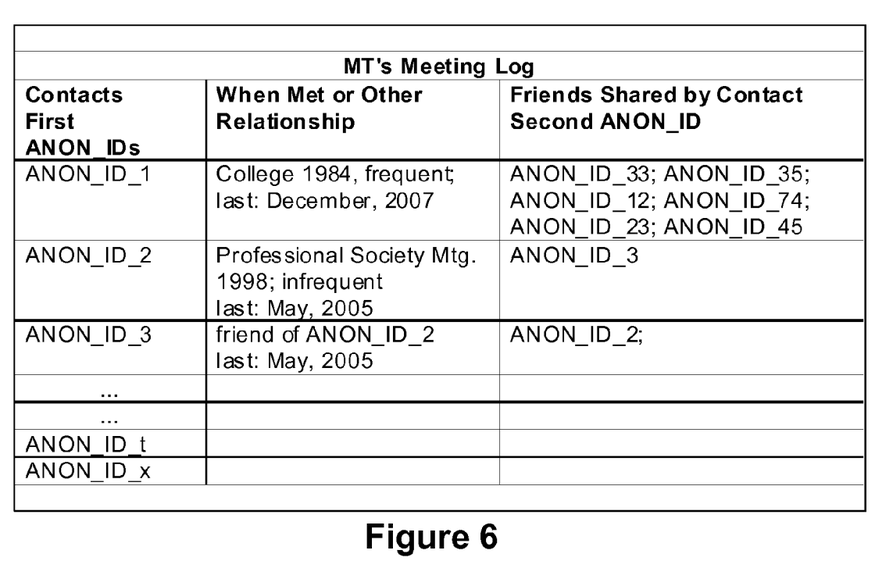
FIG. 6 is an example of the contents of a meetings log for an exemplary mobile telephone in accordance with an embodiment of the present invention.

FIG. 6 is an example of the contents of a meetings log for an exemplary mobile telephone system, such as that shown in FIG. 4, in accordance with an embodiment of the present invention. As illustrated in FIG. 6, the meetings log stored in the user's mobile telephone includes a list of ANON_IDs for all the contacts listed, and associated information such as details of past meetings with each contact, and/or such as friends in common, and cross-references between various members of the contact list known to be acquainted with one another, and other details of previous meetings with the various contacts.

Figure 7:
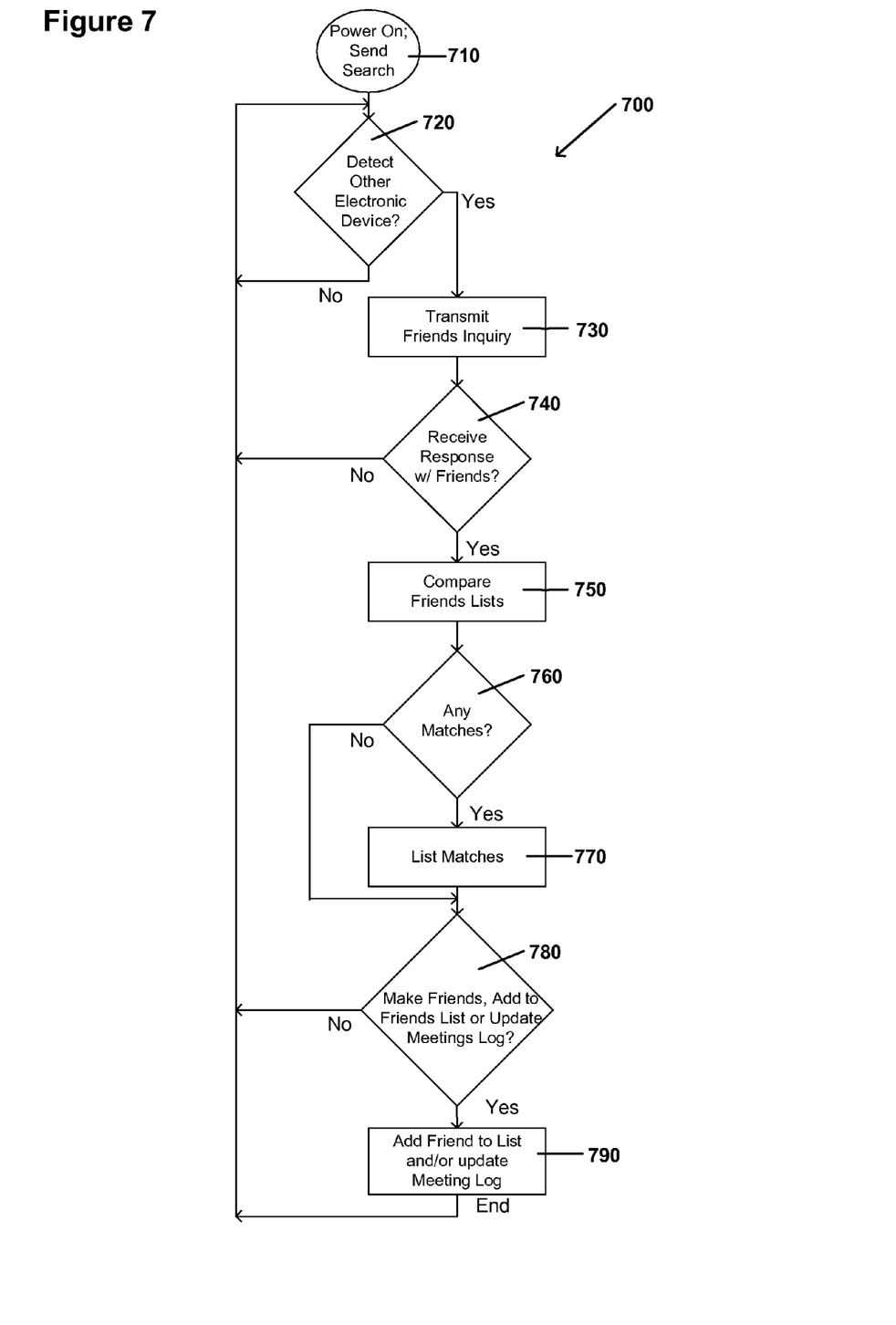
FIG. 7 is a flow chart illustrating an exemplary program in accordance with an embodiment of the present invention.

Referring next to FIG. 7, there is shown a software program flow chart 700 illustrating the operation of one electronic device, such as the first mobile telephone 10 in contact with the second mobile telephone 10', in accordance with one embodiment of the present invention. As shown in FIG. 7 at step 710, initially, the user powers on the first mobile telephone 10, and then sends a search inquiry or discovery request. The search inquiry may simply be an attempt to contact any capable device having an appropriate near-field transmitter and receiver, such as that shown in FIG. 4, and being within the near-field distance "d". The search inquiry may also include initially only the ANON_ID of the person using the first mobile telephone 10 or it may include both the ANON_ID of the person and one or more additional ANON_IDs, e.g., of the person's friends or contacts.

As shown in FIG. 7, at step 720, the software determines whether it has successfully discovered and made contact with another electronic device, e.g., the second mobile telephone 10'. If "yes", the first mobile telephone 10 has discovered and made contact with the second mobile telephone 10', then as shown in step 730, the first mobile telephone 10 transmits a Friends Inquiry to the second electronic device 10'. The transmitted Friends Inquiry may include, for example, a list of all or some subset of all the ANON_IDs stored in the friends list of first mobile telephone 10. As noted, the subset of ANON_IDs transmitted may include any selected grouping, such as friends, professional associates or family members, as determined by the user. In case no other electronic device is found to respond, the determination at the step 720 is "No", then the process terminates and returns to the first step 710. At this point, upon being returned to the step 710, the user may simply stop, or may switch to another frequency or communication method to carry out a search for other devices in the near-field. In one embodiment, the steps 720 and 730 may be combined, or may be carried out simultaneously.

Referring still to FIG. 7, when the program has transmitted its Friends Inquiry in the step 730, the program determines whether a response including friends in common, or identifying the user of the contacted device as a friend, is received from the contacted device, e.g., from the second mobile telephone 10' as illustrated in step 740. If "Yes", then the process proceeds to step 750. If "No", then the process terminates and returns to the first step 710. In the step 750, the user of the first mobile telephone 10 compares the returned list of ANON_IDs received from the second mobile telephone 10' to its own friends list to determine whether either the user of the second mobile telephone 10' or any of that user's friends have an ANON_ID that has already been stored in the first user's friends list.

Referring still to FIG. 7, when the program in the first mobile telephone 10 has received one or more ANON_ID from the second mobile telephone 10', then the software carries out a search of its friends list and/or meetings log to determine if there are any matches, as shown in step 760.

If one or more matches is found at step 760, the answer to the inquiry at the step 760 is "Yes", then the software generates a list of the matching ANON_IDs, as shown in step 770. In one embodiment, the list of the matching ANON_IDs is displayed to the user. After matching ANON_IDs are found and an output generated, the user may be notified if the user of the second mobile telephone 10' is a friend already and if there are any friends in common, based on the search of the friends list and/or meetings log. At step 780, based on the list of matches obtained in step 770, the user can determine whether to add to its friends list or update its meetings log with the information relating to the contact made and the ANON_IDs included in the contact. In one embodiment, the list of matches automatically is added to the friends list and/or the meetings log automatically is updated, as appropriate.

If no match is found at step 760, the answer to the inquiry at step 760 is "No", then the software skips the step 770, and proceeds to step 780, where the user can inquire whether the new contact might want to make friends. If the answer to the inquiry at the step 780 is "No", then the process terminates and returns to the first step 710. If the answer to the inquiry at the step 780 is "Yes", then the user of the first mobile telephone 10 proceeds to step 790, to add the new friend to its friends list and/or to update its meetings log to record the events having just transpired. Following the step 790, the process terminates and returns to the step 710. At this point, the users of the first mobile telephone 10 and the second mobile telephone 10' may meet, talk, etc., as may be appropriate. At this point, the respective users may also elect to update the personal information in their friends list, based on the new contact and/or on new information received from this meeting with the contact where the contacts were previously known to one another.

Figure 8:
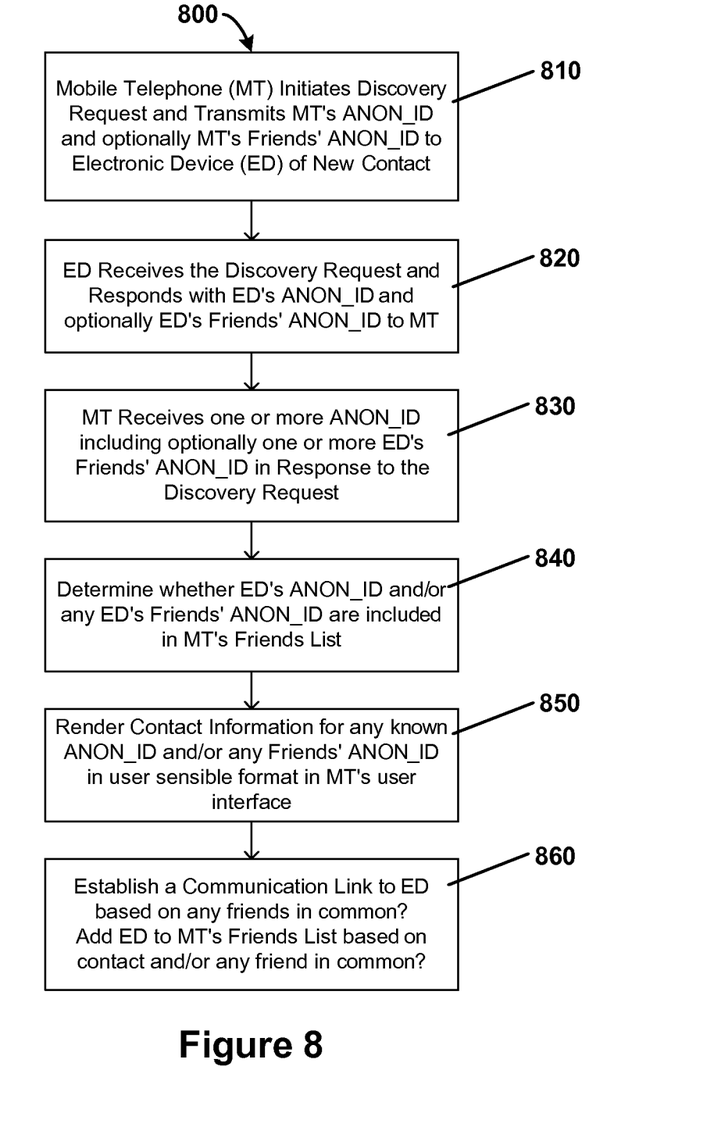
FIG. 8 is an exemplary flow chart of an embodiment of a communication method in accordance with the present invention.

Referring next to FIG. 8, there is shown an exemplary flow chart 800 of an embodiment of a communication method in accordance with an embodiment of the present invention. As depicted in FIG. 8, in a first step 810 a first user's mobile telephone (MT) (or other electronic device capable of near-field communication) initiates a discovery request and transmits the first user's ANON_ID and, optionally, the ANON_ID of one or more of the first user's friends, to a second electronic device (ED) in the near-field, which may constitute a new contact. Consistent with the previously described embodiments, MT may be the first mobile telephone 10 and ED may be the second mobile telephone 10'. In one embodiment, not explicitly depicted in FIG. 8, the first step 810 may be preceded by a step in which the first user's mobile telephone MT transmits an inquiry to determine the presence of one or more second electronic device ED, such as a mobile telephone or other compatible near-field communication device, and upon receipt of a positive response, then initiates the step 810. In this embodiment, the control circuitry activates the communications circuitry to determine near-field presence of the second electronic communication device prior to step 810. The control circuitry may carry out this determination automatically or by the user manually activating the communications circuitry to carry out this determination. In the embodiment in which this determination is automatically carried out, it may occur in a manner corresponding to the maintenance of a local connection to a mobile telephone network.

As depicted in FIG. 8, in a subsequent step 820, the second electronic device ED received the discovery request transmitted by the first user's mobile telephone MT and responds with the second device ED's ANON_ID and, optionally, with the ANON_ID of one or more friend of the user of the second device ED, which is transmitted back to the first user's mobile telephone MT.

In a subsequent step 830, the first user's mobile telephone MT receives the ANON_ID from the second user's electronic device ED, which is transmitted by the second electronic device to the first electronic device.

Thereafter, in a step 840, using the software programmed into the first user's mobile telephone, the first mobile telephone MT determines whether any of the one or more ANON_ID received from the second electronic device ED correspond to any ANON_ID listed by a friends list stored in a memory associated with the first user's mobile telephone MT.

Following the step 840, in a step 850, the first user's mobile telephone MT determines whether any matches exist and displays in a user sensible format the contact information for any known ANON_ID of either the second user's electronic device ED or of any of the second user's friends for any such matches. The user sensible format in the step 850 may include, for example, a user interface such as a display on the mobile telephone or, optionally, in an audio format from a speaker on the mobile telephone MT.

In a further step 860, the first user of the mobile telephone MT and the second user of the electronic device ED decide whether to establish a communication link between the devices MT and ED based either on knowing each other or on any friends in common. In addition, as shown in the step 860, the first user of the mobile telephone MT and the second user of the electronic device ED can each decide whether to add each other to their respective friends list, based on either the new contact between the two users or based on any friends they have in common. Of course, the first and second users may already be listed in each other's friends list, in which case the method of the present invention is used by them to discover their present proximity to each other and to make contact based on that proximity. For example, both the first and second users may already be friends and may independently arrive at a common venue, such as a shopping mall or an outdoor event, and thence may use the invention to discover the near-by presence of their friend at the same venue and to make contact with the friend. Thus, the present invention may be used both to make contact with "old" friends and to discover "new" friends, with the new contact being based on, e.g., friends or acquaintances in common and listed in one or both of the users+ friends list, or on common interests determined from one or both of the users+ meetings log.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, the steps may be executed in any order, or one or more steps may be executed at the same or substantially the time.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

What is claimed is:

1. An electronic communication device, comprising:
communications circuitry to provide near-field transmitting and receiving communications;
a user interface; and
control circuitry configured to:
(a) maintain a friends list comprising personal information of persons known to a user of the electronic communication device, the friends list also includes a first anonymous user indicia for at least a first person known to the user of the electronic communication device and associated second anonymous user indicia, wherein the first anonymous user indicia corresponds to information that identifies the first person in a database accessible by the electronic communication device but does not include personal information of the first person,
(b) maintain a meetings log comprising records of previous meetings between the user and the persons known to a user of the electronic communication device,
(c) activate the communications circuitry to determine near-field presence of a second electronic device having a predetermined modality and within communication range of the electronic device,
(d) activate the communications circuitry to transmit to the second electronic communication device a portion of the first anonymous user indicia and/or second anonymous user indicia associated with the user of the electronic communication device, wherein the second anonymous user indicia corresponds to information that identifies the user of the electronic communication device in a database accessible by the second electronic communication device but does not include personal information of the user of the electronic communication device,
(e) activate the communications circuitry to receive from the second electronic communication device third anonymous user indicia,
(f) coordinate the third anonymous user indicia with information on the friends list and/or in the meetings log to determine the presence of any matches between the first and/or second anonymous user indicia and the third anonymous user indicia; and
(g) provide to the user interface either a list of matches or an indication of no matches, but to share no personal information until such time as users of the electronic communication device and the second electronic communication device have decided to meet, thereby unambiguously identifying near-field users of electronic communication devices who are potential acquaintances in a way that allows anonymity and concealment of personal information until such time as the decision is made to actually make contact and to share such personal information.

2. The electronic communication device of claim 1 wherein the control circuitry further activates the communications circuitry to determine near-field presence of the second electronic communication device prior to (c).

3. The electronic communication device of claim 1 wherein the control circuitry further updates the friends list and/or the meetings log.

4. The electronic communication device of claim 1 wherein the second anonymous user information comprises information relating to one or more of the plurality of individual persons on the friends list.

5. The electronic communication device of claim 1 wherein the meetings log further includes information relating to contacts between pairs of the individual persons on the friends list.

6. The electronic communication device of claim 1 wherein the device is a mobile telephone.

7. A process for determining and alerting a user of the existence of known and/or prospective acquaintances in a near-field, comprising:
operating a first electronic communication device having circuitry operable to transmit and receive communications in a near-field, a user interface, control circuitry and a program stored on a non-transitory machine readable medium operable to: (a) maintain a friends list comprising personal information of persons known to a user of the electronic communication device, the friends list also includes a first anonymous user indicia for the persons including at least a first person known to the user of the electronic communication device and associated second anonymous user indicia, wherein the first anonymous user indicia corresponds to information that identifies the first person in a database accessible by the electronic communication device but does not include personal information of the first person, and (b) maintain a meetings log comprising records of previous meetings between the user and the persons known to a user of the electronic communication device;
activating the communications circuitry to determine near-field presence of a second electronic communication device having a predetermined modality and within communication range of the first electronic communication device,
upon receipt by the first electronic communication device of a positive response to the determination, transmitting from the first electronic communication device to the second communication device the first anonymous user indicia for a portion of the friends list and/or second anonymous user indicia associated with the user of the first electronic communication device, wherein the second anonymous user indicia corresponds to information that identifies the user of the first electronic communication device in a database accessible by the second electronic communication device but does not include personal information of the user of the first electronic communication device;
receiving in the first electronic communication device third anonymous user indicia from the second communication device;
coordinating in the first electronic communication device the third anonymous user indicia with information on the friends list to determine the presence of any matches between the first and/or second anonymous user information indicia and the third anonymous user indicia; and
providing either a list of matches, or an indication of no matches, to the user via the user interface of the first electronic communication device, but to share no personal information until such time as users of the first electronic communication device and the second electronic communication device have decided to meet, thereby unambiguously identifying near-field users of electronic communication devices who are potential acquaintances in a way that allows anonymity and concealment of personal information until such time as the decision is made to actually make contact and to share such personal information.

8. The process of claim 7 further comprising reviewing the list of matches and determining whether to further communicate with the second communications device.

9. The process of claim 8 further comprising communicating with the second communications device to exchange more detailed information relating to at least a portion of the first, second and/or third anonymous user indicia.

10. The process of claim 7 further comprising reviewing the list of matches and determining whether to add any item from the third anonymous user indicia to the friends list and/or to update the meetings log with information based on the third anonymous user indicia.

11. The process of claim 10 further comprising communicating with the second communications device to exchange more detailed information relating to at least a portion of the first, second and/or third anonymous user indicia, and adding the more detailed information to the friends list and/or updating the meetings log.

12. The process of claim 7 wherein the second anonymous user information comprises information relating to one or more of the plurality of individual persons on the friends list.

13. The process of claim 7 wherein the meetings log further includes information relating to contacts between pairs of the individual persons on the friends list.

14. A manufacture embodying a non-transitory machine readable medium having stored therein a program for controlling operation of an electronic device and comprising executable logic configured to:
control operation of communications circuitry providing near-field transmitting and receiving communications, a user interface, and control circuitry;
control operation of the control circuitry to (a) maintain a friends list comprising personal information of persons known to a user of the electronic communication device, the friends list also includes a first anonymous user indicia for the persons including at least a first person known to the user of the electronic communication device and associated second anonymous user indicia, wherein the first anonymous user indicia corresponds to information that identifies the first person in a database accessible by the electronic communication device but does not include personal information of the first person, and (b) maintain a meetings log comprising records of previous meetings between the user and the persons known to a user of the electronic communication device;
activate the communications circuitry to determine near-field presence of a second electronic device having a predetermined modality and within communication range of the electronic device;
activate the communications circuitry to transmit to the second electronic communication device in a near-field a portion of the first anonymous user indicia and/or second anonymous user indicia associated with the user of the electronic communication device, wherein the second anonymous user indicia corresponds to information that identifies the user of the electronic communication device in a database accessible by the second electronic communication device but does not include personal information of the user of the electronic communication device; activate the communications circuitry to receive from the second electronic communication device third anonymous user indicia;
control operation of the control circuitry to coordinate the third anonymous user indicia with information on the friends list and/or in the meetings log to determine the presence of any matches between the first and/or second anonymous user indicia and the third anonymous user indicia; and to provide to the user interface either a list of matches or an indication of no matches, but to share no personal information until such time as users of the electronic communication device and the second electronic communication device have decided to meet, thereby unambiguously identifying near-field users of electronic communication devices who are potential acquaintances in a way that allows anonymity and concealment of personal information until such time as the decision is made to actually make contact and to share such personal information.

15. The manufacture of claim 14 wherein the program further comprises executable logic to activate the communications circuitry to determine near-field presence of the second electronic communication device prior to activating the communications circuitry to transmit the anonymous user indicia.

16. The manufacture of claim 14 wherein the program further comprises executable logic to update the friends list and/or the meetings log.

17. The manufacture of claim 14 wherein the program further comprises executable logic to control operation of the control circuitry to coordinate information relating to one or more of the plurality of known individual persons on the friends list and/or in the meetings log.

18. The manufacture of claim 14 wherein the program further comprises executable logic to control operation of the control circuitry to coordinate information relating to contacts between pairs of the individual persons on the friends list and/or in the meetings log.

19. The manufacture of claim 14 wherein the program further comprises executable logic to control operation of the communication circuitry to exchange with the second communications device more detailed information relating to at least a portion of the first, second and/or third anonymous user indicia.

20. The manufacture of claim 19 wherein the program further comprises executable logic to control operation of the control circuitry to add the more detailed information to the friends list and/or to the meetings log.

* * * * *